D. JOKUBAITIS.
COMBINED COMPASS AND QUADRANT.
APPLICATION FILED OCT. 15, 1919.
1,354,195.
Patented Sept. 28, 1920.
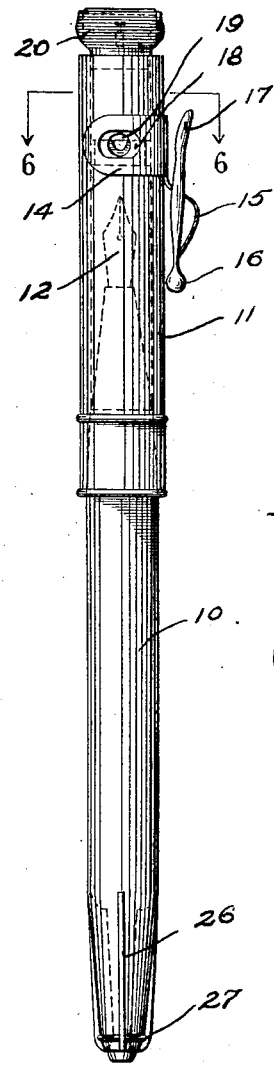
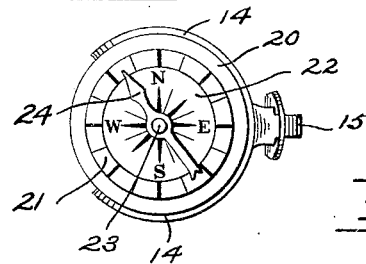
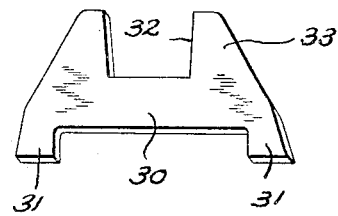
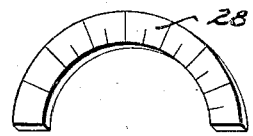
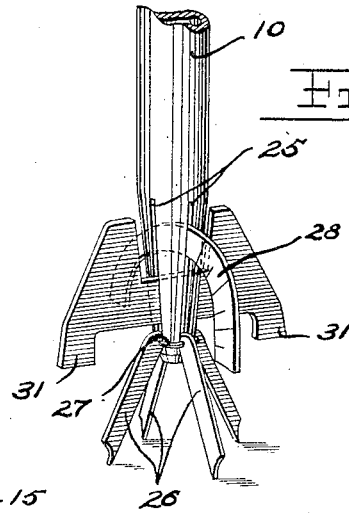
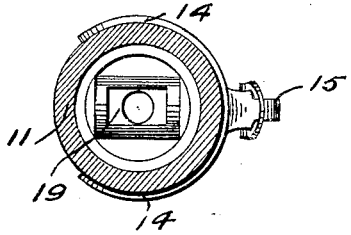
INVENTOR
Damian Jokubaitis
BY Alfred Tschinkel
ATTORNEYS

UNITED STATES PATENT OFFICE.

DAMIAN JOKUBAITIS, OF TERRE HAUTE, INDIANA.

COMBINED COMPASS AND QUADRANT.

1,354,195.  Specification of Letters Patent.  Patented Sept. 28, 1920.

Application filed October 15, 1919. Serial No. 330,708.

*To all whom it may concern:*

Be it known that I, DAMIAN JOKUBAITIS, a citizen of Russia, residing at Terre Haute, county of Vigo, and State of Indiana, have invented certain new and useful Improvements in Combined Compasses and Quadrants, of which the following is a specification.

This invention has for its object the provision of means combined with a common fountain pen whereby the points of a compass may be obtained.

A further object is to provide means whereby the implement may be held vertical when adjusted by a combined level, so that the compass will correctly indicate directions.

These objects are attained by the novel construction and combination of parts hereinafter described and shown in the accompanying drawings, forming a material part of this disclosure, and in which—

Figure 1 is a side elevational view showing an implement made in accordance with the invention.

Fig. 2 is an enlarged top plan view thereof.

Fig. 3 is a perspective view showing one of the supporting means used in connection with the apparatus.

Fig. 4 is a quadrant engageable with the apparatus, whereby the inclination of the implement may be determined.

Fig. 5 is a fragmentary perspective view showing the lower end of the apparatus with the support elements extended, and Fig. 6 is an enlarged transverse sectional view taken on line 6—6 of Fig. 1.

Referring to the drawings in detail, the numeral 10 designates the body or barrel of the apparatus, here indicated to be that of a conventional type of fountain pen, the same being provided with a cylindrical cap 11, into which the penpoint 12 extends.

Engaged near the upper portion of the cap 11 are a pair of spring arms 14, partially encompassing the cap and from which extends an angular spring 15, formed with a clamp knob 16, operable by the lever handle 17, thus providing means whereby the implement may be engaged within the pocket of a garment.

Formed in the arms 14 are elongated slots 18 through which may be observed a small but accurate level 19, fixed in the cap above the pen point 12.

Formed at the upper end of the cap 11 is an annular recessed terminal 20, and contained within the recess is a dial 21, graduated into parts of the circle, this dial being circumjacent to a center dial plate 22, carrying characters indicating north, east, south and west, at the center of which, on a pivot 23, is mounted a magnetic needle 24, these parts comprising a miniature compass, but entirely capable of practical use.

Formed through the conical opposite end of the tubular body 10 are four slots 25, in which are contained an equal number of support bars 26, hingedly engaged by the ring 27, which surrounds the outer, smaller end of the body 10. These support elements being normally held within the slot by frictional contact.

When the support elements are extended as shown in Fig. 5, the same may be placed upon any relatively level surface so as to hold the entire apparatus in a vertical position, but if it be desired to incline the same a graduated segment plate 28 may be passed through the slots 25 so that the inclination of the implement can be obtained.

Another form of support is comprised of a plate 30 also adapted to pass through the slots 25, it having projections 31 upon its lower surface, and containing a recess 32, formed between the angular upwardly extending elements 33 so that the same may be forced upward from the slots 25 engaging the barrel 10 whenever it is desired.

From the foregoing it will be seen that a neat appearing implement has been disclosed, specially adapted for a traveler's use whereby the points of the compass may be ascertained, and that the implement may be placed in a vertical position, by means of the level, and adjustable supports so that the compass is worked in a satisfactory manner.

Having thus described my invention what I claim as new and desire to secure by Letters Patent, is—

1. In a device of the class described, the combination with a barrel, of a plurality of supports pivotally engaged in one end of said barrel by which it may be supported in a vertical position, and a segment plate adapted to pass through one of the slots whereby the inclination of said barrel may be ascertained.

2. In a device of the character described, the combination of a barrel with a plurality of support bars engaging with their ends said slots, a ring surrounding the barrel and pivotally connecting the ends of said support bars to said barrel, said barrel adapted to support a compass, substantially as described and for the purpose set forth.

In testimony whereof I have affixed my signature.

DAMIAN JOKUBAITIS.